Patented Aug. 17, 1937

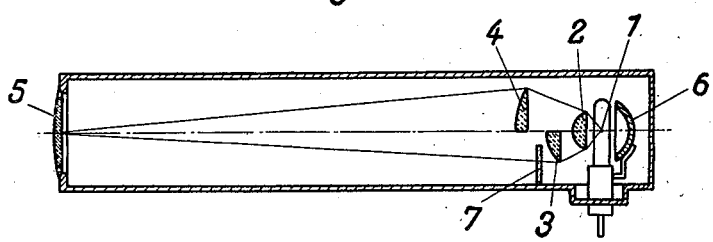
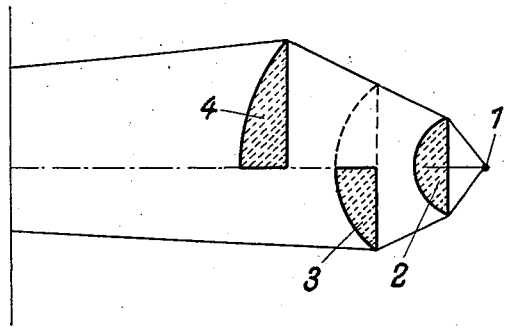
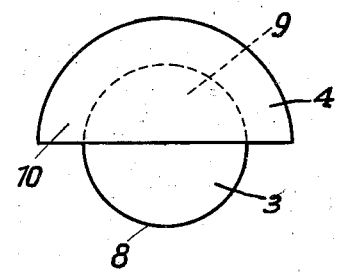
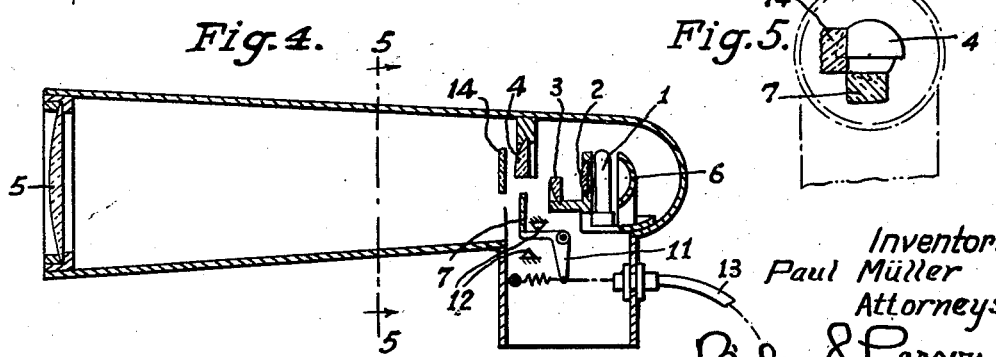

2,090,062

UNITED STATES PATENT OFFICE 2,090,062

HEADLIGHT FOR MOTOR VEHICLES

Paul Müller, Berlin-Friedrichshagen, Germany, assignor to N. V. Machinerieen-en Apparaten Fabrieken "Meaf", Utrecht, Netherlands Application September 27, 1935, Serial No. 42,505
In Germany October 10, 1934

3 Claims. (Cl. 240—41.3)

This invention relates to a headlight for motor vehicles that is free from glare.

The illumination of an automobile road must be perfectly free from glare so as not to dazzle the driver, i. e., the lamps must not emit glaring light above a certain height and, laterally, not beyond a certain direction, and provision must therefore be made for sharply defining the light beyond these planes. This requirement is only imperfectly met by lamps of the usual type owing to the fact that the illuminant of such a lamp, for instance the incandescent lamp filament, is so constructed as to prevent sharp definition of the light. The different radius vectors of, say, a parabolic mirror, which from the focal length of the vertex to the parameter increase already at the ratio of 1:2, always produce an unsharp edge of the cone of dispersion, so that the transition from absolute darkness to greatest brightness takes place at an angle which does not insure perfect freedom from glare for the long ranges now required.

This end can, however, be attained by employing half lenses in the arrangement mentioned above. According to the invention, the optical equipment comprises a condenser lens having a wide angle, a condenser half lens of shortest focal length disposed in front of the condenser lens, an additional condenser half lens which takes up the rays of light not caught by the first condenser half lens and which has greater focal length than the first condenser half lens, and an objective lens in the center of which the rays of light coming from the condenser system converge. Sharp upward definition is achieved by arranging a ground glass disc in front of the lens having a short focus. According to circumstances, the lateral direction of the light may be sharply defined by suitable diaphragms. The density of the ground glass disc is chosen so that it will dim sufficiently and, in reversed direction, disclose at least the outline of the vehicle. Furthermore, the ground glass disc can be made adjustable by means of a Bowden wire or other suitable means to dim also distance lighting.

The invention is diagrammatically illustrated in the accompanying drawing, in which Figure 1 is a total view of the device in longitudinal section. Fig. 2 shows the condenser system according to Fig. 1 on an enlarged scale. Fig. 3 is a front view of the condenser system shown in Fig. 2 and discloses the light distribution or field of light which is to be projected by the objective lens. Fig. 4 shows a modification of the invention shown in Fig. 1, while Fig. 5 is a diagrammatic front view of a part of Fig. 4 taken along lines 5—5 of Fig. 4.

Referring to the drawing, 1 is the illuminant behind which a mirror 6 is positioned for better utilization of the light flux. In front of the illuminant 1 a condenser lens 2 of shortest focus is disposed which on account of its short focal length has a very wide angle and causes some convergence of the light rays. The lens 2 has in front of it a half lens 3 having the shortest possible focal length and being intended for insuring maximum optical density for distance lighting. According to the invention, instead of the upper half of the lens 3 a half lens 4 is provided which has a greater focal length than the lens 3 and therefore also a larger diameter. Since in place of the missing upper half of lens 3 shown in dotted lines in Fig. 2 the larger half lens 4 is used, the upper part of the field of light which is to be projected is not the field 9 but the field 10 as shown in Fig. 3 of the drawing. In this way, the light of the illuminant 1 in the upper half of the field of vision is distributed over a larger area than it would be if the upper half 9 were present, and the result is that the light intensity will be lower in the upper half 10 of the field of light than in the lower half 8. The lower half of the field of light can therefore be used for distance effect with great light intensity and the upper half 10 for near effect with a reduced light intensity.

The field of light produced by the condenser system shown in Figs. 2 and 3 is projected to the outside by an objective lens 5 toward the center of which the light rays coming from the condenser system converge. Since the image is reversed by this projection of the field of light, the parts of the street which are more distant from the headlight are illuminated by the light emanating from lens 3, while the parts of the street closer to the headlight are illuminated by the light emanating from lens 4. For obtaining a sharp upward definition of the beam of light, a diaphragm or ground glass plate 7 can be arranged in front of the condenser lens 3. In order that this definition or restriction can be differently adjusted as desired, in the modification according to Fig. 4 the diaphragm 7 is movably adjustable by being secured by a pivotable support 11 which can be turned about its axis by a Bowden wire 13. For restricting the movement of the diaphragm stops 12 can be provided. The beam of light can also be restricted in lateral direction by a diaphragm 14, which can likewise be made adjustable in the same manner as diaphragm 7.

The arrangement according to the invention affords, as stated, the advantage that for distance lighting only a small angle of dispersion but strong light and for near lighting a larger angle and reduced brightness are employed, whereby an optimum utilization of light is insured. Particularly with respect to the lower energies which it is desired or possible to expend for these purposes, this utilization of light is of essential importance in determining the suitability of a lamp for illuminating automobile roads, and attention is further to be called to the utilization due to the illumination of the angle directed upon the road.

I claim:—

1. A headlight for vehicles comprising a source of light, a condenser system of short focal length in front of and near said source comprising two half lenses of different diameter and focal length on opposite sides of the axis of said headlight and spaced axially at different distances from said source, a diaphragm in front of at least one of said half lenses, and a lens of large focal length positioned in front of said diaphragm and said half lenses so as to project two beams of light, at least the upper beam of which is sharply defined by said diaphragm.

2. A headlight for vehicles comprising a source of light, a condenser system of short focal length in front of and near said source comprising a lens of short focal length in immediate vicinity of said source, a half lens below the axis of said headlight for taking up a portion of the light emanating from said first lens, a second half lens of larger diameter and focal length than said first half lens and above said axis for taking up the remaining portion of the light of said first lens, said second half lens being spaced from said source a greater distance axially than said first half lens, a diaphragm in front of at least one of said half lenses, and a lens of large focal length positioned in front of said diaphragm and said half lenses so that the beam of light emanating from said last lens is sharply defined by said diaphragm.

3. A headlight as defined by claim 2 further comprising means for adjusting said diaphragm relative to said lower half lens for controlling the beam of light emanating from said last lens.

PAUL MÜLLER.